Figure 1:
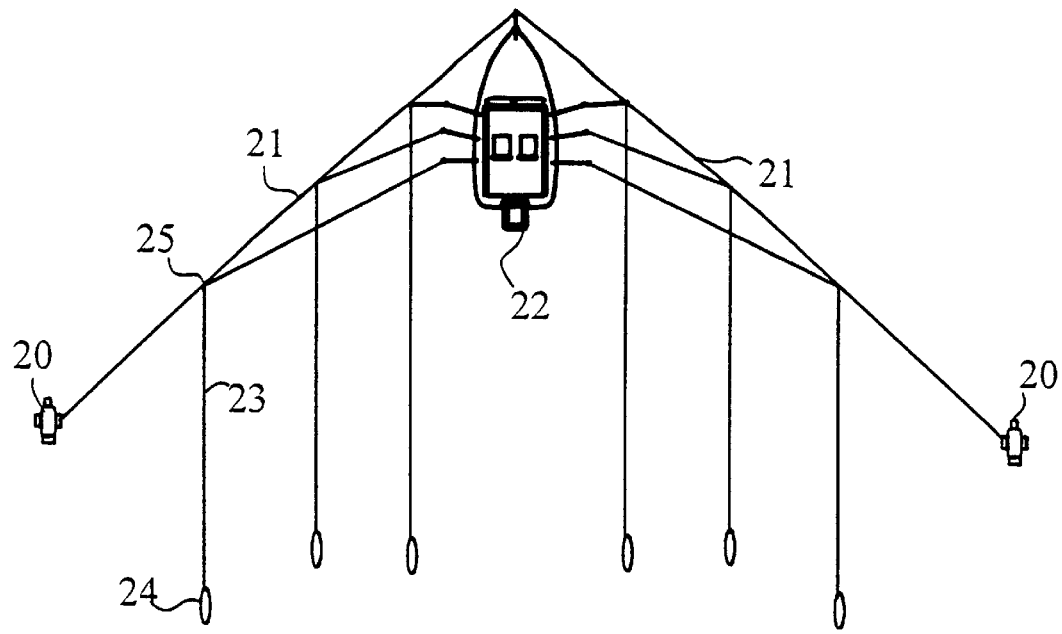

United States Patent
Ruppa

Patent Number: 6,055,765
Date of Patent: May 2, 2000

[54] FISHING DEVICE

[75] Inventor: Juhani Ruppa, Korpilahti, Finland

[73] Assignee: KL-Teho Oy, Korpilanti, Finland

[21] Appl. No.: 09/060,503

[22] Filed: Apr. 15, 1998

[30] Foreign Application Priority Data

| Apr. 17, 1997 | [FI] | Finland | 971639 |
| Sep. 18, 1997 | [FI] | Finland | 973724 |

[51] Int. Cl.⁷ .......................... A01K 93/00; A01K 91/00
[52] U.S. Cl. ............................................................. 43/43.13
[58] Field of Search .................... 43/43.13, 43.14, 43/9.7

[56] References Cited

U.S. PATENT DOCUMENTS

| 3,401,483 | 9/1968 | Bellah | 43/43.13 |
| 3,507,068 | 4/1970 | Roberts | 43/43.13 |
| 3,748,775 | 7/1973 | Wagner | 43/43.13 |
| 3,818,624 | 6/1974 | Duffy | 43/43.13 |
| 3,908,300 | 9/1975 | Kuismi | 43/43.13 |
| 3,949,512 | 4/1976 | Stegemeyer | 43/43.13 |
| 3,973,347 | 8/1976 | Kearney | 43/43.13 |
| 4,028,840 | 6/1977 | Wille | 43/43.13 |
| 4,524,538 | 6/1985 | Halvorsen | 43/43.13 |
| 4,920,689 | 5/1990 | Anderson | 43/43.13 |
| 5,185,951 | 2/1993 | Hemmerle | 43/43.13 |
| 5,548,919 | 8/1996 | Hicks . | |
| 5,636,467 | 6/1997 | Adams | 43/43.13 |

*Primary Examiner*—Kurt Rowan
*Attorney, Agent, or Firm*—Altera Law Group LLC

[57] ABSTRACT

A fishing device, which is a so-called side planer designed to be towed by a boat and which comprises a float (1) to keep the fishing device afloat, a holding fixture (2) for the attachment of a tow line used to draw the device, and a keel (3) attached to the float and having a plate-like fin (4) to steer the fishing device slightly outward from the direction of travel of the boat towing the device, and a weight (5) to keep the fishing device in an upright position. The float (1) is a bottle. The fishing device comprises a frame (6) consisting of a single solid body of plastic material, forming a socket-like casing (7) adapted to the shape of the outer surface of the bottle to receive the bottle inside the casing so as to attach it to the frame.

15 Claims, 3 Drawing Sheets

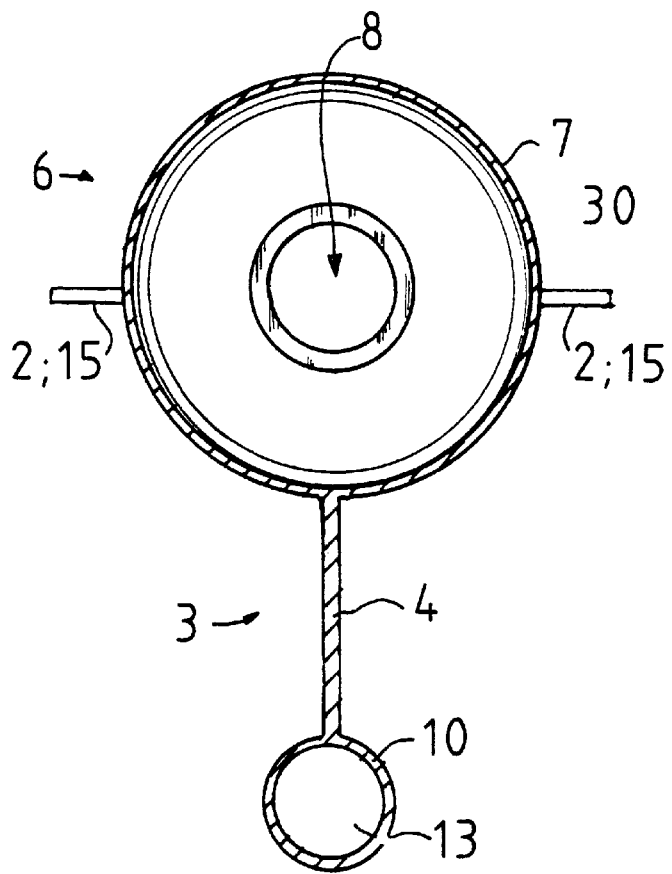
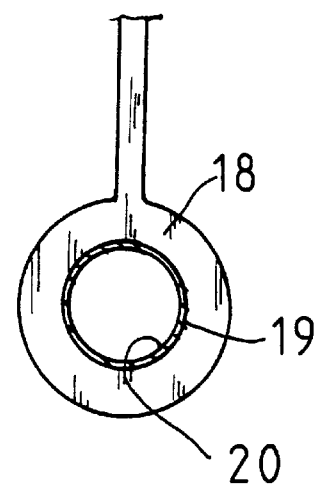
Fig. 5
Fig. 4

FISHING DEVICE

The present invention relates to a fishing device as defined in the preamble of claim 1.

In prior art, e.g. specification U.S. Pat. No. 5,548,919 presents a so-called side planer fishing device. The side planer comprises a float to keep the fishing device afloat, a holding fixture for a tow line used to tow the device, and a plate-like keel provided with a weight in conjunction with the float to direct the fishing device slightly outward from the direction of travel of the towing boat and to keep the fishing device in an upright position. In the specification, all these parts are comprised in a plate-like casing body. When the fishing device is towed using a tow line connected to a boat, the tow line will be sufficiently tensioned so that a trolling line can be connected to the tow line by means of a releasing holder, thus allowing the trolling line to be drawn at a lateral distance from the boat.

This method of trolling is used to catch fish at a relatively large lateral distance, e.g. up to 50 m, from the course of the boat.

A problem with prior-art side planers is that they use a construction comprising both a float and a keel inside one or more box-type frames, resulting in a complicated and expensive structure. Furthermore, adjustment of the buoyancy of the float is difficult or impossible.

The object of the present invention is to eliminate the drawbacks described above.

A specific object of the invention is to disclose a fishing device that is simple in construction and inexpensive and which allows e.g. in ordinary soft drink bottle to be used as a float.

The fishing device of the intention is characterised by what is presented in claim 1.

According to the invention, the float is a bottle, and the fishing device comprises a frame consisting of a single solid body of plastic material, forming a socket-like casing adapted to the shape of the outer surface of a bottle to receive a bottle inside the casing so as to connect it to the frame.

The invention has the advantage that a cheap and simple fishing device frame can be formed via a single operation. When the float is e.g. an ordinary cylindrical bottle tapering toward its mouth, the casing surrounding the bottle is of circular cross-section and tapers toward the mouth or the bottle, being adapted to its shape. The bottle may be e.g. an ordinary 1 l or 1.5 l plastic bottle as used for soft drinks. The use of existing bottles obviates the need to fabricate the float separately, and when a float is broken, a spare part is always available. Such a bottle is usually transparent, so it can house a light source, e.g. an ordinary torch or a glow bar based on a chemical reaction, to render the float more visible. If necessary, it is also possible to place some additional ballast in the bottle, such as water, thus allowing adjustment of its immersion.

In an embodiment of the fishing device, the device has a fin made of the same solid plastic material with the casing and laid parallel to the longitudinal axis of the casing, and a weight box formed at the edge of the fin and having a hollow space inside to receive a weight.

In an embodiment of the fishing device, the front end of the casing as seen in the direction of advance is provided with a round hole having a diameter somewhat larger than the external diameter of the mouth part of the bottle, so that the mouth part of the bottle, which is provided with threads for a cap, can be inserted through the hole and the bottle can be secured to the casing by means of the bottle cap.

In an embodiment of the fishing device, the front edge of the fin is provided with a guide to achieve a steering effect in a desired direction.

In an embodiment of the fishing device, the fixture is a fastening flange formed in the outer surface of a casing half and provided with an aperture for the attachment of a tow line.

In an embodiment of the fishing device, the fastening flange is provided with a row of apertures for the adjustment of the point of attachment of the tow line.

In an embodiment of the fishing device, the weight consists of material considerably heavier than water, such as metal pellets.

In an embodiment of the fishing device, the weight is a metal bar.

In an embodiment of the fishing device, the fishing device comprises a banner.

In an embodiment of the fishing device, the banner comprises a mounting flange with a hole, slot or the like fitted to receive the mouth of the bottle into it, allowing the banner to be attached to the bottle by means or the bottle cap.

In an embodiment of the fishing device, the assembly formed by the frame and the keel has been fabricated by injection moulding from polypropylene.

Figure 2:
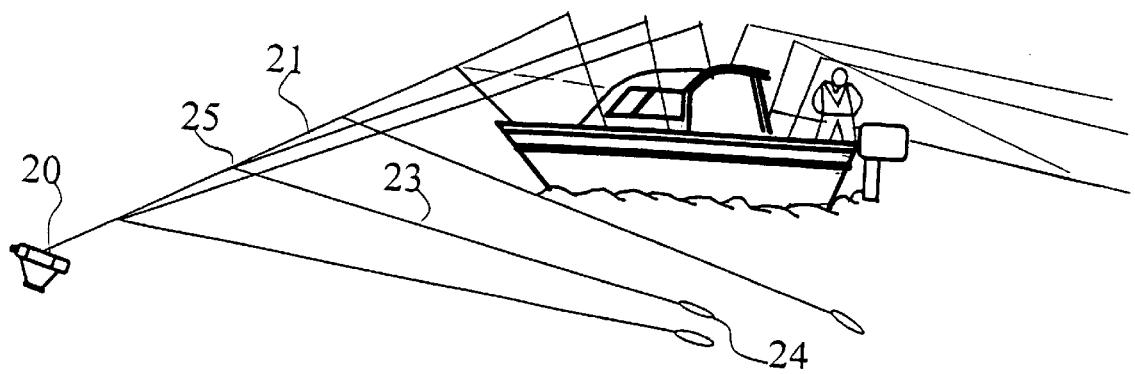
Figure 3:
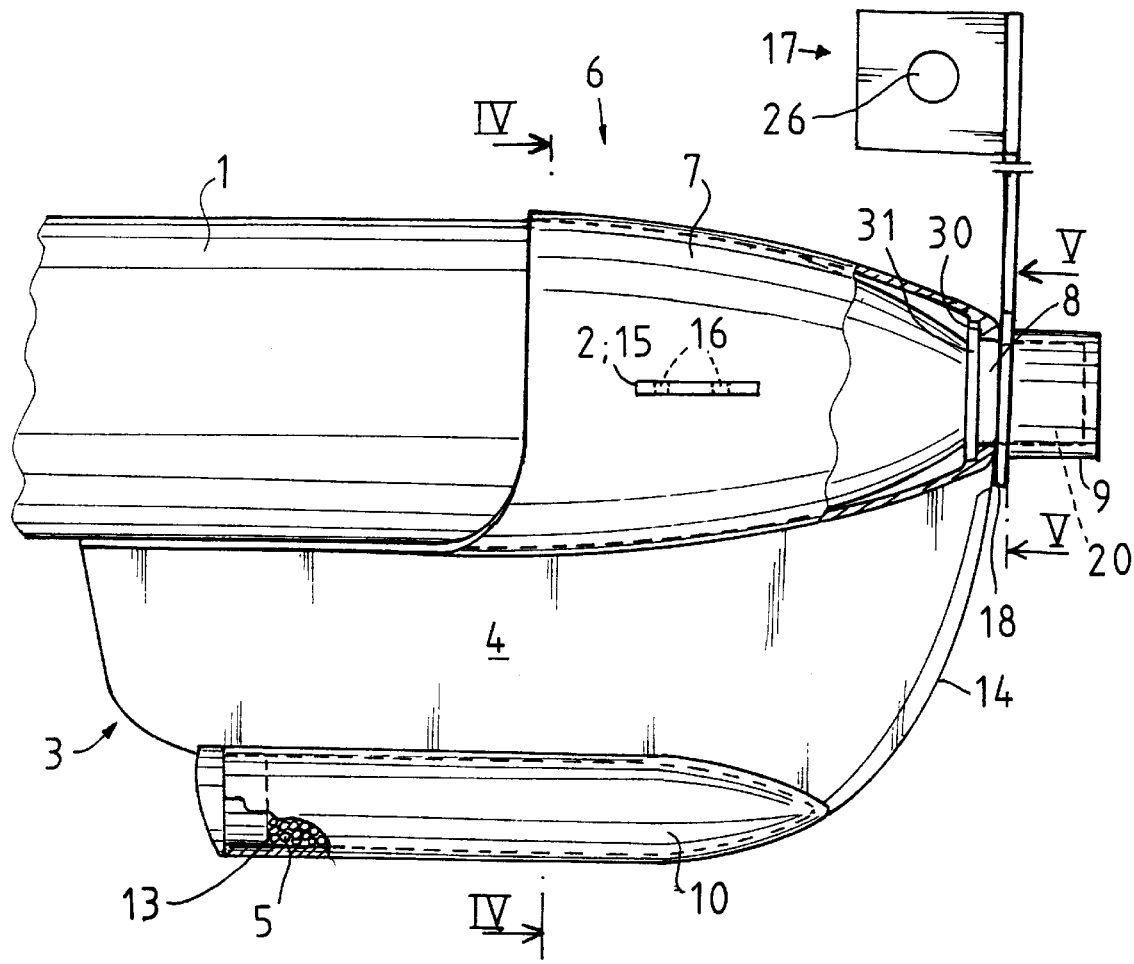

In the following, the invention will be described in detail by the aid of a few examples of its embodiments by referring to the attached drawing, in which FIG. 1 illustrates the use of a fishing device as provided by the invention on both sides of a boat, in top view, FIG. 2 illustrates the fishing arrangement of FIG. 1 in lateral view, FIG. 3 presents an embodiment of the fishing device of the invention in lateral view, FIG. 4 presents section IV—IV of FIG. 3, and FIG. 5 presents section V—V of FIG. 3.

FIGS. 1 and 2 illustrate a fishing method involving the use of a fishing device as provided by the invention, a so-called side planner 20. Two side planers 20 are connected with tow lines 21 to a moving boat 22, on either side of the boat. The side planer 20 floats on the water surface and the keel comprised in it keeps it upright. A sufficient tension of the tow lines 21 has been achieved by providing the side planer with a keel that tends to steer the side planer slightly laterally outward relative to the course of the boat. The tow line 21 acts as a supporting element for fishing lines 23, which have lures 24 attached to their ends. The fishing lines 23 are connected to desired points along the length of the tow line 21 using known releasing holders 25 which have two jaws spring-loaded against each other and pressing the fishing line between them so that, when a fish takes the lure, the fishing line can be released from between the jaws of the releasing holder.

FIG. 3 shows a side planer with a bottle, preferably a plastic bottle as a float 1. An ordinary plastic bottle provided with a flange can be used. The float bottle 1 is mounted in the frame 6 of the side planer. The frame 6 is a body having thin walls of the same solid plastic material, e.g. polypropylene, comprising a keel 3, which consists of a flat fin 4 and a weight 5 at its lower edge. In addition, the frame 6 has a holding fixture 2 for the attachment of a tow line.

As shown in FIGS. 3 and 4, the frame 6 comprises a socket-like casing 7 adapted to the shape of the outer surface of a bottle to receive a bottle inside the casing to connect it to the frame. Below the casing 7 is a fin 4 or the same solid plastic material, laid in a direction parallel to the longitudinal axis of the frame. At its lower edge, the fin 4 has a weight box 10 of the same solid plastic material with the fin and the casing. The weight box 10 has a hollow space 13 inside it, in which a weight 5 can be placed. The weight 5 may consist of grainy bulk material, such as lead pellets, in which case the size of the weight can be easily adjusted. Alternatively, the weight placed in the hollow space 13 inside the weight box 10 may be a solid metal bar. The front edge of the fin 4 is provided with a guide 14 to achieved a steering effect in a desired direction.

At the front end of the casing 7 there is a round opening 8 having a diameter somewhat larger than the external diameter of the mouth part 20 of the bottle 1 so that the bottle mouth can be inserted through the opening 8 and the bottle can be secured in the casing by means of the bottle cap 9. Formed on the inside of the casing 7 is a ring-like stop face 30 against which the collar 31 near the mouth part of the bottle can be pressed.

The holding fixture 2 for the tow line is a flange 15 formed on the outer surface of the casing 7, which is provided with a row of holes 16 for the attachment of the tow line. By changing he point of attachment of the tow line by moving it to different holes 16, it is possible to change the direction in which the side planer tends to be driven.

The fin part 4 of the keel 3 is a planar part that forms a solid body with the casing 7 and has a weight box 10 at its lower edge. The weight box 10 is a substantially tight case with a substantially hollow interior space 13 in which the weight 5 can be placed.

The plastic material from which the assembly presented in FIG. 3 is manufactured is preferably fluorescent plastic, which further improves the visibility of the planer.

FIG. 3 shows that the 4 has a guide flange 14 at its front edge, which has been adapted so as to achieve a suitable course for the side planer.

As shown in FIGS. 3 and 5, the side planer is also provided with a banner 17 for better visibility. The banner 17 may be equipped with a prismatic reflector and/or light source 26 to make it easier to follow its course in dark conditions. The light source may be e.g. an electric lamp, which can be powered by electricity supplied from the boat via an electric conductor combined with the tow line. The banner 17 comprises a mounting flange 18 with an opening 19 fitted to receive the mouth 20 of the bottle 1, so that the banner can be fastened to the bottle by means of the cap 9.

The invention is not restricted to the examples of its embodiments described above, but many variations are possible within the scope of the inventive idea defined by the claims.

I claim:

1. A fishing device to be towed by a boat, comprising:
   a float for keeping the fishing device afloat, said float comprising a bottle;
   a frame consisting of a single solid body of plastic material, forming a casing adapted to the shape of the outer surface of the bottle for receiving the bottle inside the casing and attaching the bottle to said frame;
   a holding fixture connected to said frame for attaching a tow line thereto, said holding fixture used for drawing the fishing device;
   a keel attached to said frame, said keel having:
      a flat fin for steering the fishing device slightly outward from the direction of travel of the boat towing the fishing device, and
      a weight for keeping the fishing device in an upright position, so that when the fishing device is drawn by the tow line having one end connected to the fishing device and one end connected to the boat, a sufficient tension will be created in the tow line to allow trolling lines connected with releasing holders to the tow line to be drawn at a lateral distance from the boat.

2. A fishing device according to claim 1, wherein said fin is made of the same plastic material as the casing and lies parallel to a longitudinal axis of the casing, and the fishing device further comprising a weight box formed at an edge of said fin and having a hollow space inside it in which said weight can be placed.

3. A fishing device according to claim 1, wherein a front end of the casing as seen in the direction of advance is provided with a round hole of a diameter somewhat larger than an external diameter of a mouth portion of the bottle, so that the mouth of the bottle can be inserted through the hole and the bottle can be secured to the casing by means of a bottle cap that attaches to the mouth of the bottle.

4. A fishing device according to claim 1, wherein the bottle used as said float comprises a plastic bottle.

5. A fishing device according to claim 4, wherein the plastic bottle comprises a soft drink bottle.

6. A fishing device according to claim 1, wherein a front edge of said fin is provided with a guide for steering the fishing device in a desired direction.

7. A fishing device according to claim 1, wherein said holding fixture comprises a fastening flange formed on an outer surface of the casing and is provided with a hole for attaching the tow line thereto.

8. A fishing device according to claim 7, wherein said holding fixture comprises a fastening flange formed on an outer surface of the casing and is provided with a plurality of holes for allowing adjustment of the point of attachment of the tow line to one or more of said holes.

9. A fishing device according to claim 1, wherein said weight comprises material substantially heavier than water.

10. A fishing device according to claim 9, wherein said weight comprises metal pellets.

11. A fishing device according to claim 9, wherein said weight comprises a metal bar.

12. A fishing device according to claim 1, further comprises a banner coupled to said frame.

13. A fishing device according to claim 12, wherein said banner comprises a mounting flange defining a hole for receiving a mouth portion of the bottle therethrough for attaching said banner to the bottle by means of a bottle cap.

14. A fishing device according to claim 1, wherein an assembly formed by said frame and said keel is injection-molded from polypropylene.

15. A fishing device to be towed by a boat, comprising:
   a float for keeping the fishing device afloat, said float comprising a bottle;
   a frame comprising a body of plastic material, forming a casing adapted to the shape of the outer surface of the bottle for receiving the bottle inside the casing and attaching the bottle to said frame;
   a holding fixture connected to said frame for attaching a tow line thereto, said holding fixture used for drawing the fishing device;
   a keel attached to said frame, said keel having:
      a flat fin for steering the fishing device slightly outward from the direction of travel of the boat towing the fishing device, and
      a weight for keeping the fishing device in an upright position, so that when the fishing device is drawn by the tow line having one end connected to the fishing device and one end connected to the boat, a sufficient tension will be created in the tow line to allow trolling lines connected with releasing holders to the tow line to be drawn at a lateral distance from the boat.

* * * * *